United States Patent [19]

Pollklas

[11] Patent Number: 5,575,316

[45] Date of Patent: Nov. 19, 1996

[54] DEVICE FOR AUTOMATIC FILLING OF CONTAINERS

[75] Inventor: Manfred Pollklas, Rheda-Wiedenbrück, Germany

[73] Assignee: Claas oHG beschraenkt haftende offene Handelgesellschaft, Harsewinkel, Germany

[21] Appl. No.: 386,058

[22] Filed: Feb. 7, 1995

[30] Foreign Application Priority Data

Feb. 8, 1994 [DE] Germany ............................ 44 03 893.3

[51] Int. Cl.$^6$ ................................................ B65G 65/32
[52] U.S. Cl. .............................. 141/198; 141/96; 141/231; 141/279; 141/387; 414/345; 414/397; 340/617; 340/619; 340/621
[58] Field of Search ............................. 141/95, 96, 198, 141/231, 255, 256, 263, 264, 279, 387; 414/345, 397, 398, 505, 523; 340/612, 617, 619, 621

[56] References Cited

U.S. PATENT DOCUMENTS

| | | | |
|---|---|---|---|
| 2,864,517 | 12/1958 | Dickenshied, Jr. | 414/572 |
| 2,930,657 | 3/1960 | Delzer | 414/523 X |
| 3,246,313 | 4/1966 | Weaklend | 340/617 |
| 3,964,620 | 6/1976 | Parsons | 141/95 X |
| 4,437,497 | 3/1984 | Enander | 141/198 X |
| 4,476,460 | 10/1984 | Motsinger | 340/617 |
| 4,785,664 | 11/1988 | Reebs | 340/621 X |
| 4,823,366 | 4/1989 | Williams | 340/612 X |
| 5,004,400 | 4/1991 | Handke | 414/786 |
| 5,194,747 | 3/1993 | Culpepper et al. | 340/619 X |

FOREIGN PATENT DOCUMENTS

| | | |
|---|---|---|
| 2658800 | 2/1990 | France. |
| 1988578 | 6/1968 | Germany. |
| 1945020 | 5/1971 | Germany. |
| 0122626 | 10/1976 | Germany. |
| 2914995 | 10/1980 | Germany. |
| 2945251 | 5/1981 | Germany. |
| 3411540 | 10/1985 | Germany. |
| 3533073 | 4/1986 | Germany. |
| 3726930 | 2/1989 | Germany. |

Primary Examiner—J. Casimer Jacyna
Attorney, Agent, or Firm—Browdy and Neimark

[57] ABSTRACT

A device for automatic filling of a mobile container (4) with a material stream (13) from a harvester (1) moving alongside a discharge knee/discharge pipe which is controllably pivotable around a vertical and/or horizontal axis, with a pivotable discharge flap (5) at the end from the harvester (1) to the container (4). At least one optical and/or acoustic range finder (6) for measuring the container (4) and measuring fill levels is disposed on the discharge knee/discharge pipe (3). The range finder (6), either together with the discharge knee/discharge pipe (3) or independently thereof, can be pivoted horizontally and/or vertically. It sends distance signal (ES) to an electronic control installation which, according to the received distance signals, causes horizontal and/or vertical pivoting of the discharge knee/discharge pipe (3), if necessary by means of pivoting the discharge flap (5), for changing the discharge direction of the material stream into the container (4), so that as complete as possible loading of the container (4) is achieved with as few losses as possible.

24 Claims, 15 Drawing Sheets

Fig.1

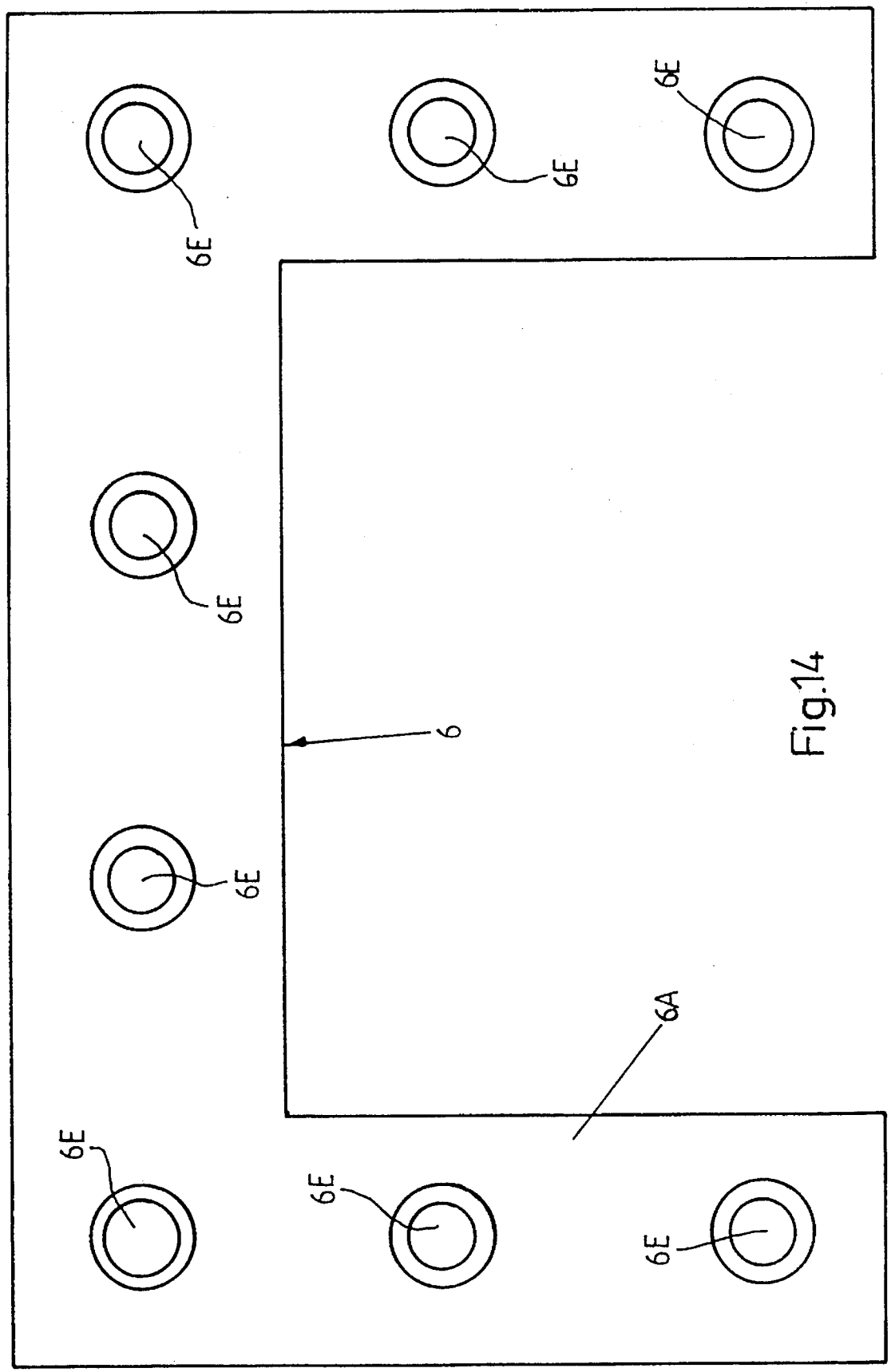

DEVICE FOR AUTOMATIC FILLING OF CONTAINERS

FIELD OF THE INVENTION

The invention relates to a device for automatic filling of a container, in particular a mobile one, with of material stream, in particular in connection with a harvester moving alongside, such as a field chopper or a combine, having a discharge knee/discharge pipe which is controllably pivotable around a vertical and/or horizontal axis, or a transfer belt conveyor, possibly with a pivotable discharge flap at the end, for transporting the material stream, such as silage, grain, or the like from the harvester to the container.

DESCRIPTION OF THE RELATED ART

During the harvesting operation of a field chopper or combine, a container wagon pulled by a tractor moves alongside it and is continuously loaded with the stream of the freshly chopped or threshed material in that the chopped material is conveyed from the filed chopper by means of a discharge accelerator via a discharge knee to the container wagon. In the course of this it is necessary for the drivers of the field chopper and the tractor to monitor the material stream continuously so that the material stream does not fall to the ground next to the container and is thus lost. Among other things, this requires continuous matching of the movement speeds of the field chopper and the tractor, as well as their distance from each other. Furthermore, the mobile container is to loaded as completely and evenly as possible. The utilization of the container volume to as complete an extent as possible means that the number of times the container wagons are interchanged, and thus the number of interruptions of the movement of the field chopper during harvesting can be reduced.

During the harvesting season the down-times of harvesters with such a large workload result in economic losses. Because of the requirement for monitoring the material stream from the field chopper to the container wagon the attention of the drivers of the field chopper and the tractor is considerably strained. When observing the material stream, the field chopper driver has the option to pivot the discharge knee manually in such a way that the material stream lands in a different place in order to distribute the crop material evenly in the container wagon. However, this means an additional strain on the field chopper driver. In the course of turning in particular, during and after a change in direction, for example at the end of a row of corn, crop material often falls to the ground next to the mobile container.

Combines have a grain reservoir which is either emptied during threshing via a hydraulically pivotable grain discharge pipe into a container wagon or is emptied during stops. The above mentioned loading problems also occur here. Emptying the stopped combine also requires the presence of an operator during emptying. He needs to pivot the discharge pipe or move the container wagon in respect to the discharge pipe in such a way that the mobile container is loaded as fully and evenly as possible with the flowing material. The grain is often also evenly distributed in the container wagon manually by means of a shovel. This work prevents a further shortening of the idle time, although modern combines per se have a great discharge rate.

A harvester having a controllable and movable nozzle discharging the crop material into an attached wagon is known from EP 0 131 693 B1. Two sensor means are provided there, which are used for scanning the relative pivoted position of the nozzle and the relative alignment of the harvester and the wagon. These scanning means are constituted by potentiometers. The nozzle is periodically pivoted through a predetermined pivot angle range sequentially into several positions to achieve an even loading of the wagon. When moving through turns, the pivot angle range of the nozzle is automatically greatly limited in accordance with the signals of the sensor means.

A device for controlling a discharge chute of crop crushing loaders for loading a trailer, the container, pulled by a tractor alongside it, is known from EP 0 070 340B1. The relative pivot position of the discharge chute in relation to the long direction of the trailer is determined there in that a radio wave transmitter and receiver are disposed on the discharge chute, and a reflector in the form of a concave mirror on the trailer. The waves emitted by the radio wave transmitter are reflected by the reflector to the receiver.

With these known devices the pivot control is respectively designed for a special combination of a harvester and specifically equipped containers.

SUMMARY OF THE INVENTION

It is the object of the invention to provide a device for loading containers with a material stream, in particular for harvesters, which allows an automatic, loss-free and as complete as possible loading of the container, is safely and dependably constructed and can be arbitrarily used with different nonspecific containers.

This object is attained in accordance with the invention in that at least one optical and/or acoustic range finder for measurement of the container and for measuring the fill level of the loaded material in the container is disposed on the discharge knee/discharge pipe, wherein the range finder can be pivoted horizontally and/or vertically together with the discharge knee/discharge pipe or independently thereof, and that distance signals generated by the range finder are supplied to an electronic evaluation and control installation, which accordingly continuously regulates a horizontal and/or vertical pivot position of the discharge knee/discharge pipe and/or a pivot positions of the discharge flap in such a way that as complete as possible loading of the container is achieved with as few losses as possible by means of fedback distance signals.

Various advantageous arrangements of range finders are selectively provided. Locating beams can act on a circular or frame-like scanning surface on the discharge flap around the material stream. Even three, or preferably four locating beam are sufficient which are distributed on all sides of the material stream and aligned approximately parallel with it. In this way it is always possible to determine when the rim walls have been reached and to trigger a corresponding reversal of movement of the discharge flap or continued pivoting of the discharge knee. A further variant is the independent pivot arrangement of two narrow locating beams which are pivoted in parallel planes along both sides of the material stream and in this way detect approximately transversely to the container the respective level of the loaded material and the position of the edges of the lateral walls of the container.

The geometry of the ejector and the various pivot angles of the ring mount, the discharge knee, the discharge flap and if necessary the scanner are continuously reported to the evaluation and control installation which, in conditions when special distance measuring criteria have been met, for example if a large width occurs when moving over the rim walls or the width change gradient changes abruptly, calculates by means of a coordinate transformation from the polar or toroidal measurement coordinates in Cartesian coordinates in relation to the direction of travel and the vertical line, so that length, width, lateral distance, bottom height, rim wall height, fill level, etc. of the container result therefrom.

Different strategies are disclosed for the approximately meander-shaped control of the material stream over the loading surface, whose employment is disclosed matched with the disposition of the range finder.

BRIEF DESCRIPTION OF THE DRAWING

Advantageous embodiments are represented in the drawings and will be described in detail below. Shown are in.

DETAILED DESCRIPTION OF THE PREFERRED EMBODIMENTS

Figure 1:
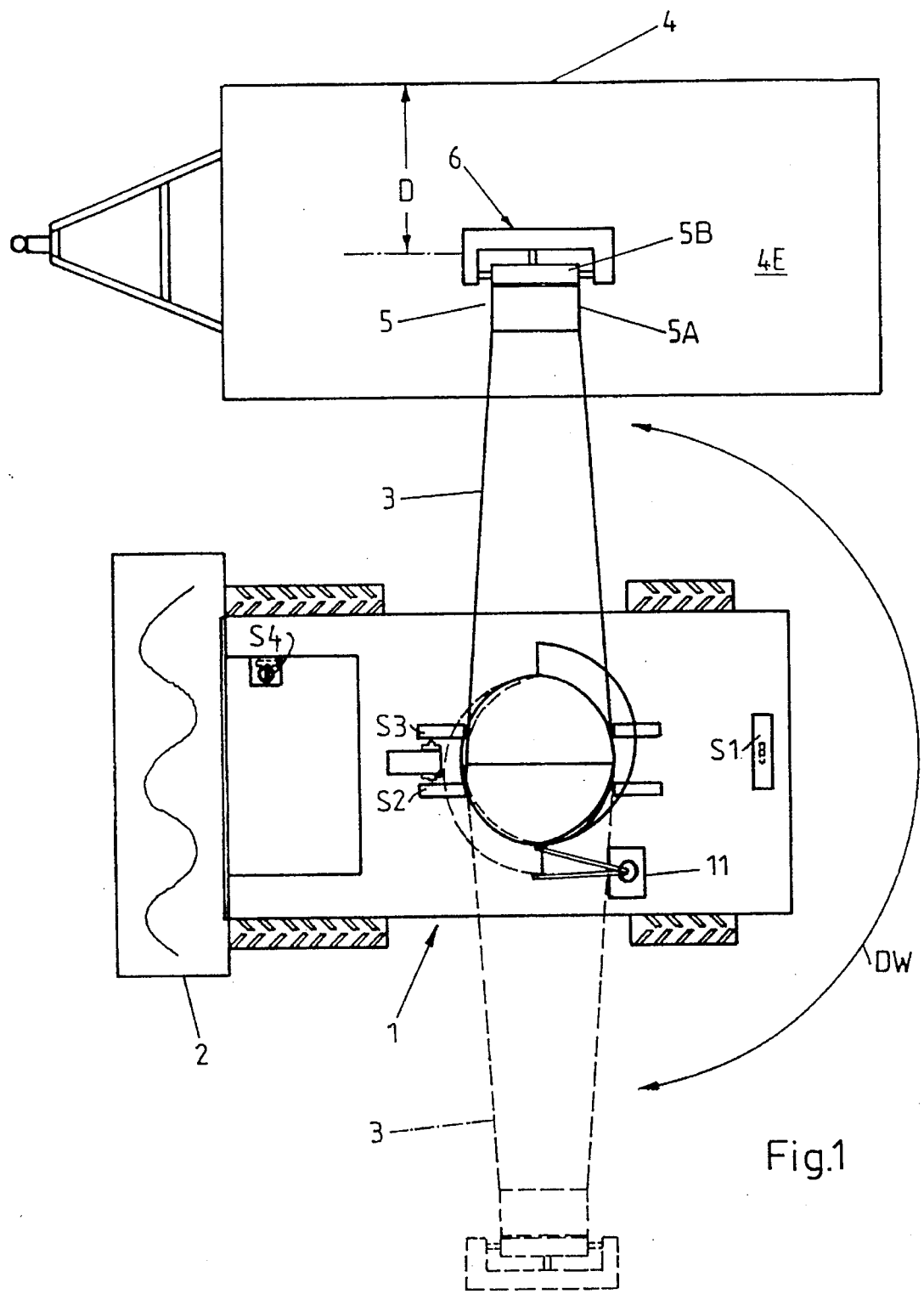
FIG. 1, a top view of a harvester with a discharge knee and a range finder disposed on a discharge flap thereof and positioned above a container wagon, FIG. 2, a lateral view of the discharge knee seated on a ring mount, in the horizontal position of the discharge flap, FIG. 3, a lateral view of the discharge knee is a position wherein the discharge flap if downwardly inclined by almost 90°, FIG. 4, a block wiring diagram of an electronic evaluation and control installation, control valves, switches and indicator lights, FIG. 5, a top view of the container of a container wagon with a material stream impacting on it and four scanning spots of the range finder disposed around it, FIG. 6, a top view of the container with scanning points of the range finder partially located next to the container, FIG. 7, a vertical section through a partially filled container with two scanning points of the range finder signaling different fill levels, FIG. 8, a top view of the container with a scanning surface of the range finder enclosing the impacting material stream, FIG. 9, a top view of the container as in FIG. 8, but with a scanning surface partially located outside the container, FIG. 10, a height scale and a longitudinal section through a container wagon with a range finder disposed above it, FIG. 10A, the signal paths of the distances along an empty container wagon measured by means of the range finder via the locating beams, FIG. 11, a height scale and a longitudinal section through a container wagon with a discharge flap with the range finder disposed above it in the position inclined vertically by 90°, FIG. 11A, the signals paths in the range finder during vertical pivoting of the discharge flap with the range finder, FIG. 11B, the control voltage path in the inclination control valves for vertical pivoting of the discharge flap, FIG. 12, a height scale and a longitudinal section through a partially filled container wagon with the range finder disposed above it, FIG. 12A, the signal paths in the range finder during pivoting along the partially filled container wagon, FIG. 13, a height scale and a cross section through a partially filled container wagon with the discharge flap disposed above it and the range finder in the position inclined downward by 90°, FIG. 13A, the signal paths in the range finder during vertical pivoting of the discharge flap above the partially filled container wagon, FIG. 13B, the control voltage path in the inclination control valves during pivoting, FIG. 14 to 17, frontal views of various embodiments of the range finder, FIG. 18, a cross section through a partially filled container wagon with a locating beam impinging on the loaded material and the bundle of reflected beams originating therefrom, FIG. 19, an enlarged section of the scanning area of the locating beam (see FIG. 18) with incident locating beams and reflected beams, FIG. 20, a Laser scanning arrangement at a discharge knee in a lateral view, FIGS. 21A to 21C, top views of the Laser scanning arrangement in various pivot states of the scanner, FIG. 22, a container in cross section in connection with a first load control process with a Laser scanner, FIG. 23 and 23A, a container cross section in connection with a second load control process in two allocations to the discharge location with a Laser scanner.

A harvester 1, for example a filed chopper, with a cutter assembly 2 and a discharge knee/discharge pipe pivotable horizontally over 180° is shown in FIG. 1. The discharge knee 3 is used for transporting the harvested material stream 13 from the harvester 1 to a container 4, for example a container wagon. A two-part, vertically pivotable discharge flap 5 is disposed at the discharge end of the discharge knee 3. An optical and/or acoustic range finder 6 is located on the pivotable discharge flap 5. The container 4 can be measured in its length, width and depth by means of this range finder 6 and the fill levels h of the loaded material 14 in the container 4 can be determined. Furthermore, by its means it is possible to check whether the material stream 13 enters the container 4 or missed the container 4 altogether or partially. The range finder 6 can be pivoted horizontally and/or vertically together with the discharge knee 3 and the discharge flap 5.

Figure 3:
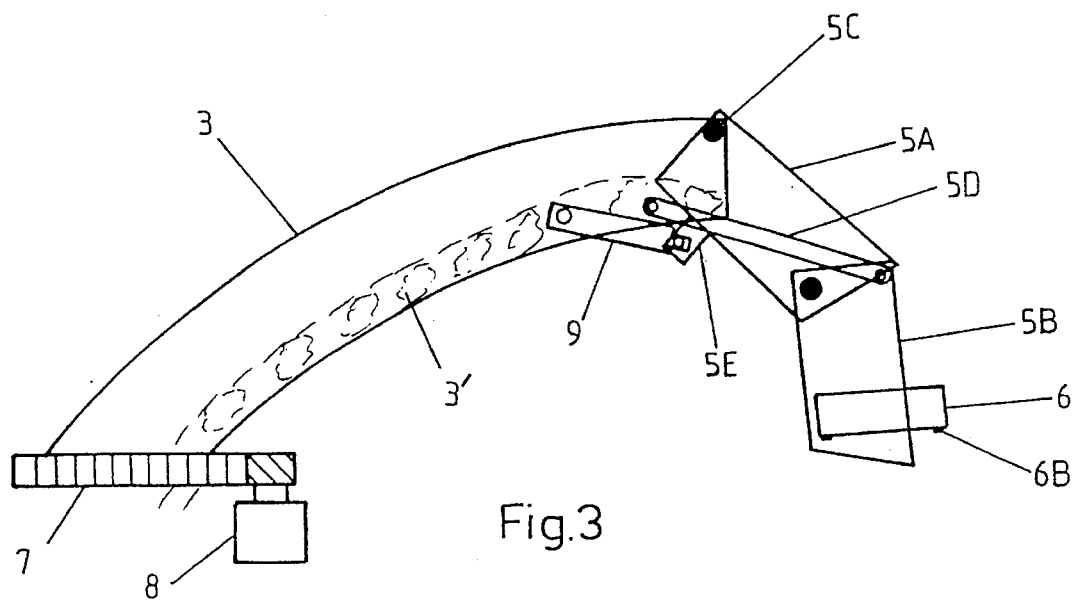

A transfer belt conveyor 3' may also be provided as shown in FIG. 3.

Figure 4:
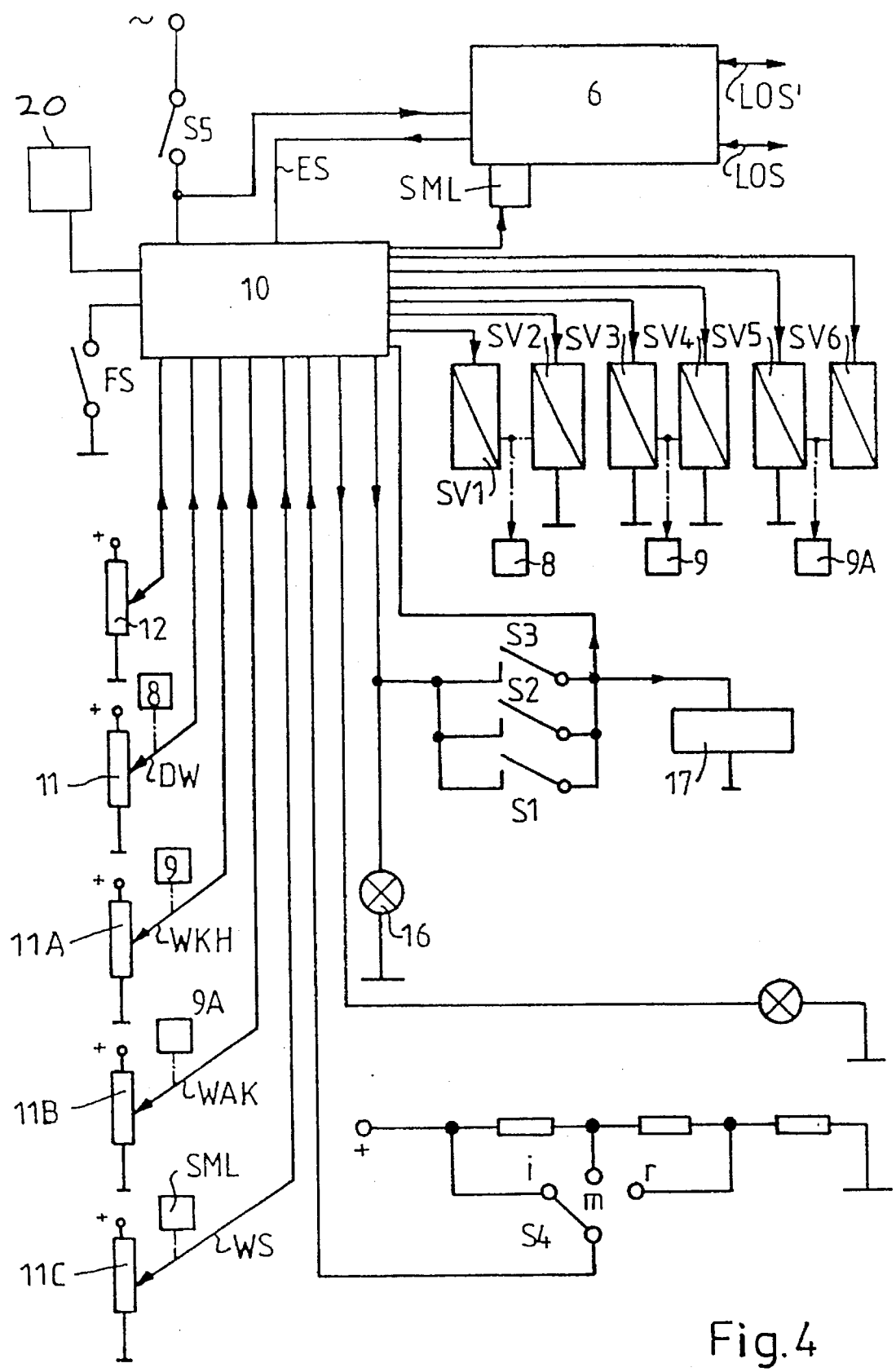

The distance signals ES generated by the range finder 6 are provided to an electronic evaluation and control installation 10 (see the block wiring diagram in FIG. 4). Corresponding to the distance signals ES received from the range finder 6, the evaluation and control installation 10 comprising a microprocessor with a digital memory causes horizontal and/or vertical pivoting of the discharge knee 3 and/or the discharge flap 5 for changing the direction of discharge of the material stream 13 into the container 4, so that filling of the container 4 as free of loss and as completely as possible is achieved.

A maximum fill level of the loaded material 14 in the container 4 can be input into the evaluation and control installation 10. Once this fill level, measured with the range finder 6, has been locally reached in the respective scanning area, the evaluation and control installation 10 causes the systematically continuing pivoting of the discharge knee 3 and/or the discharge flap 5 for changing the discharge direction, so that the material stream 13 continuously impacts on another location in the container 4 with a lesser fill level h, but does not hit the rim wall.

The maximum fill level can be manually set by means of a potentiometer 12, whose output voltage is supplied to the evaluation and control installation 10. Alternatively to this, the fill level is entered into the evaluation and control installation 10 by means of a keyboard or is derived from initially determined container hold data.

The discharge knee 3 is seated on a ring mount 7 (see FIGS. 2 and 3), horizontally pivotable over a pivot angle range of approximately 180° between two pivot angle end positions respectively disposed vertically in relation to the long direction of the harvester. With this a container wagon 4 for receiving the harvested material can be driven parallel on the left or the right side alongside the harvester. The entire discharge knee 3 can be made so it is continuously height-adjustable. In an alternate embodiment the pivot angle range is approximately 240°.

Figure 2:
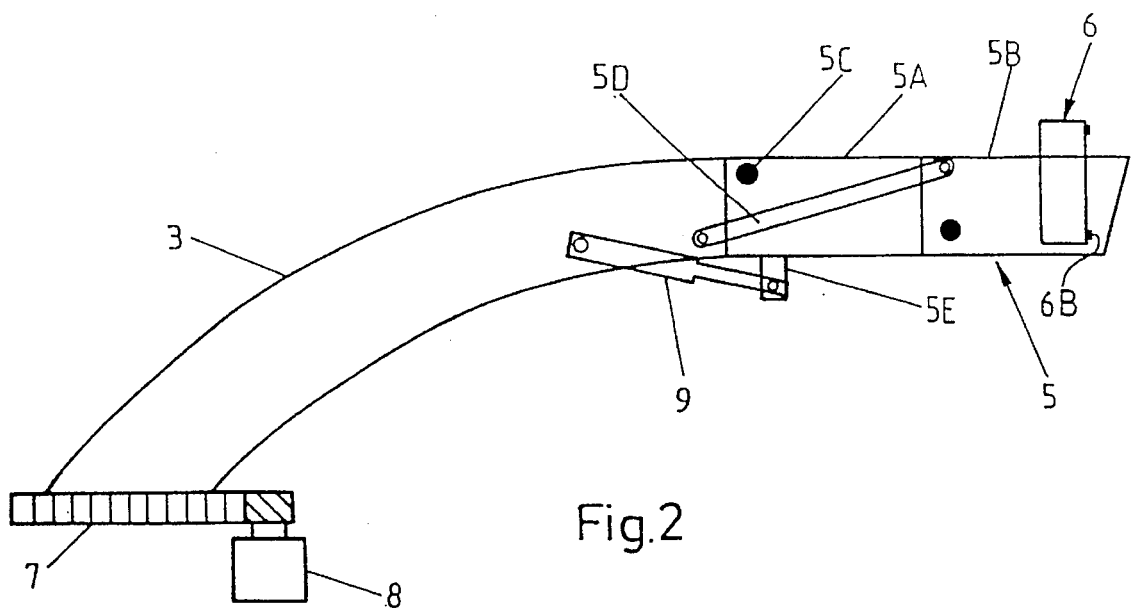

Lateral views of the discharge knee 3 with the discharge flap 5 in the horizontal and the downward inclined position are shown in FIGS. 2 and 3. A hydraulic cylinder 9 is hinged to the discharge knee 3 which acts on a pivot lever SE, disposed on a first flap section 5A of the discharge flap 5, for vertical pivoting of the discharge flap 5. The first flap section 5A of the discharge flap 5 is maintained in a hinge shaft 5C on the discharge knee 3. The second, outer flap section 5B of the discharge flap 5 is pivotably connected with the first flap section 5A. In addition a connecting and holding rod 5D is disposed on at least one side between the discharge knee 3 and the second, outer flap section 5B, which is rotatably seated on both the discharge knee 3 and the second flap section 5B. In this way the first flap section 5A and the holding rod 5D form a four-bar straight-line mechanism supporting the second flap section 5B so it pivots along with it.

The range finder 6 is disposed in a U-shaped housing 6A on the second outer flap section 5B, open toward the bottom, of the discharge flap 5 and overlaps it from above.

Figure 15:
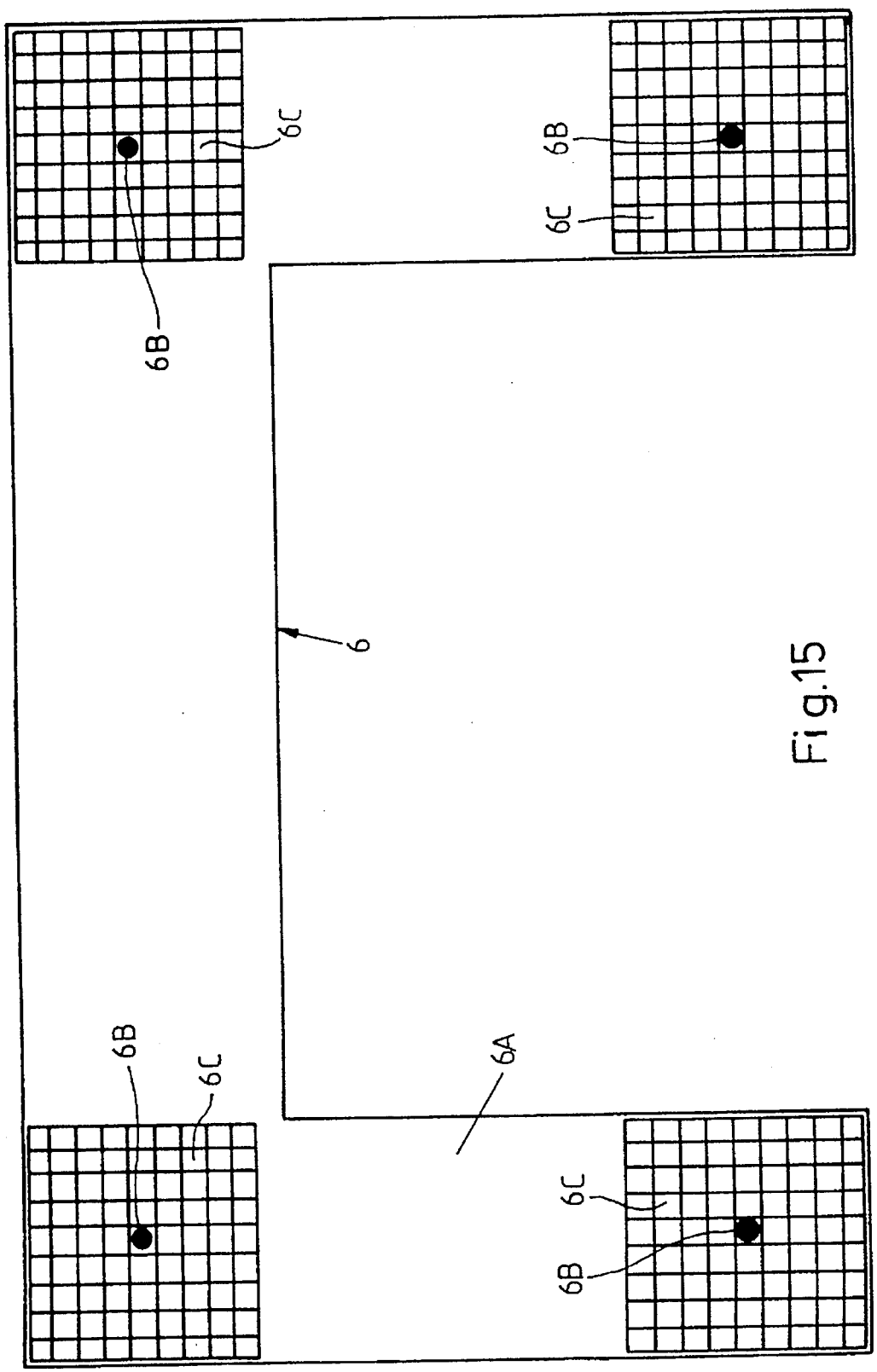

In an embodiment in accordance with FIG. 15, the range finder 6 is constituted by a Laser-interferometer measuring device with one or a plurality of transmitting Lasers 6B and photosensitive cells 6C.

Figure 16:
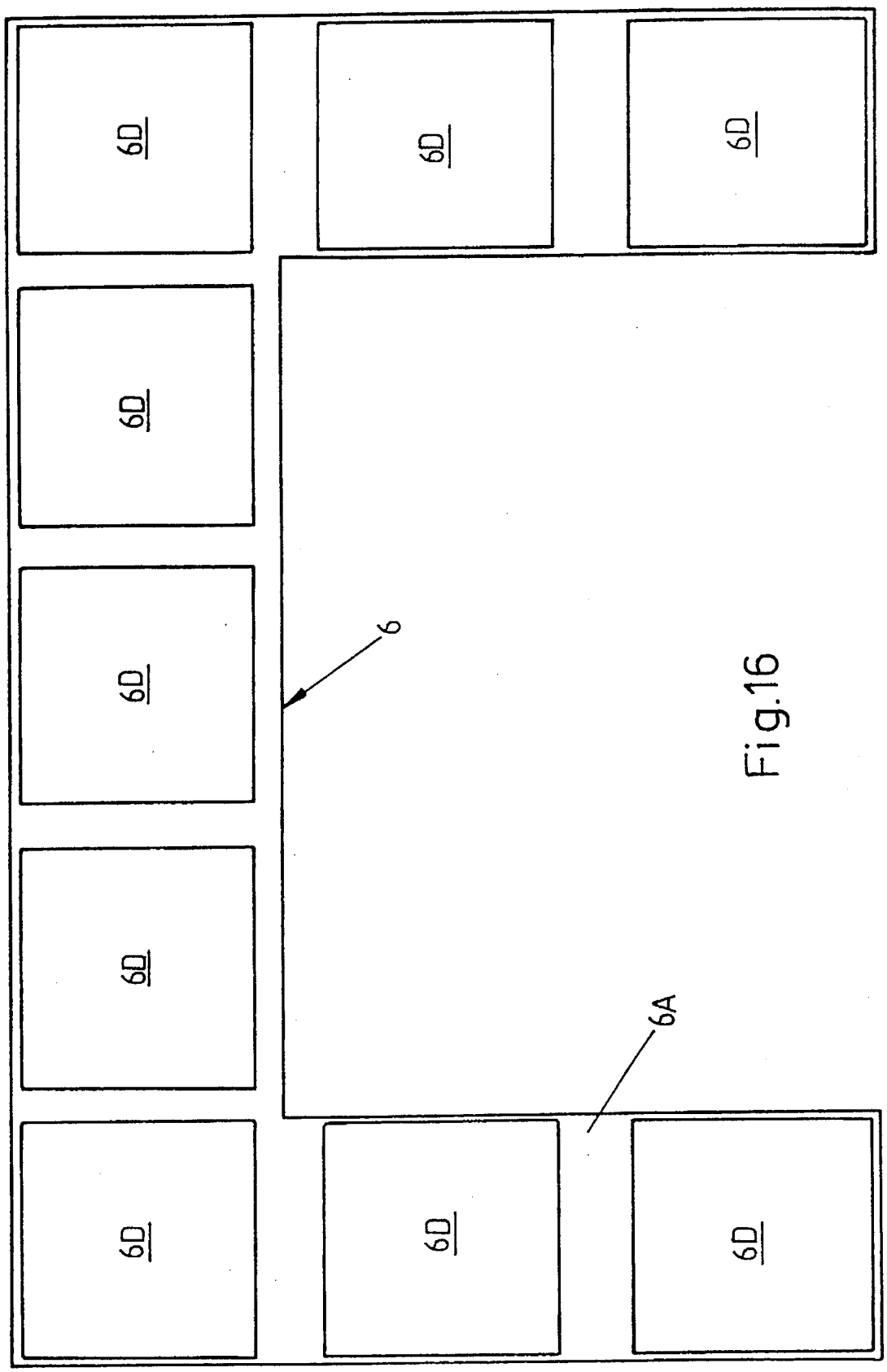
Figure 17:
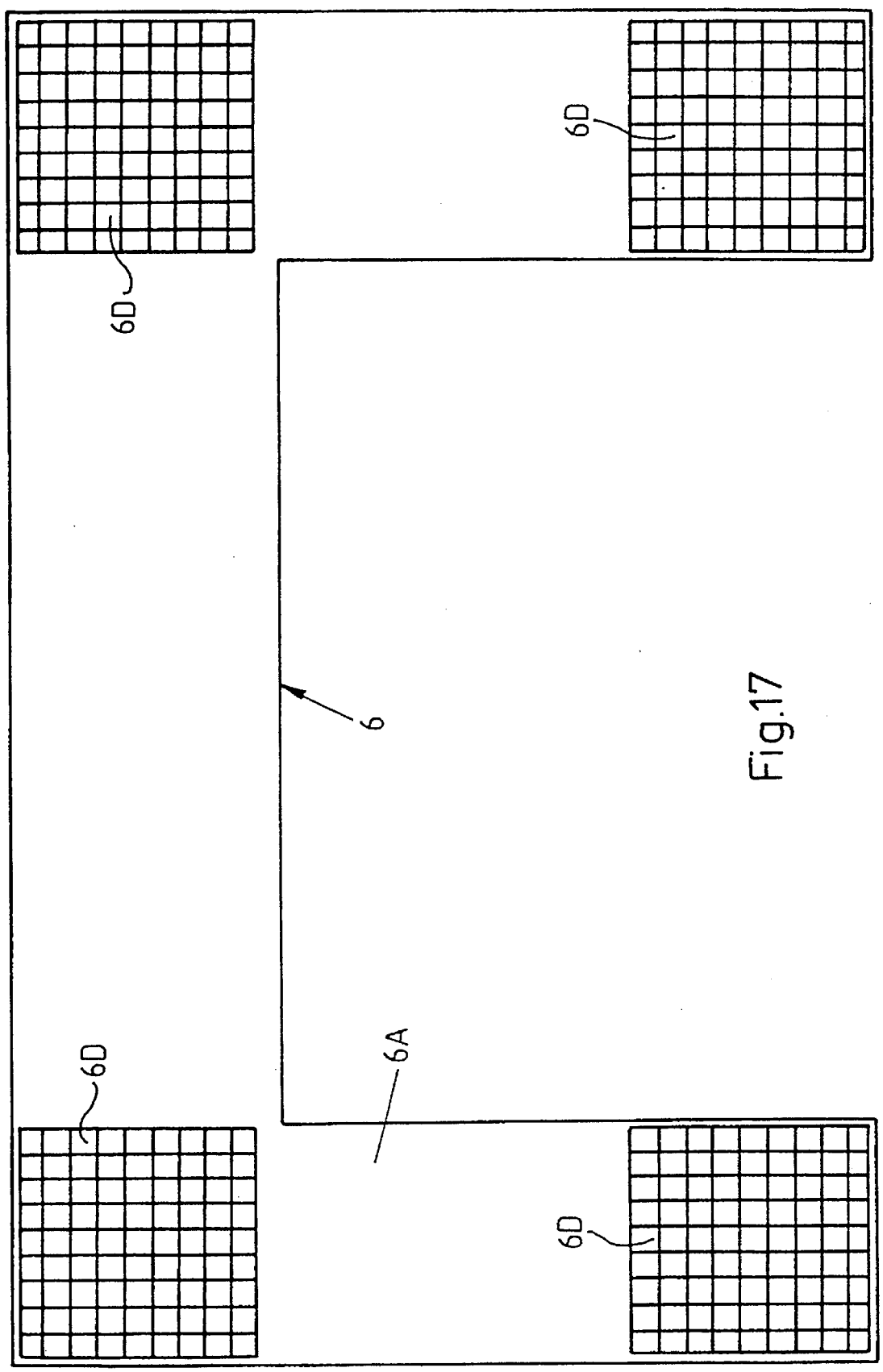

In an alternate embodiment in accordance with FIGS. 16 and 17, the range finder 6 is constituted by an ultrasound measuring device with one of a plurality of ultrasound transmitters and receivers 6D, such a piezo elements.

Figure 5:
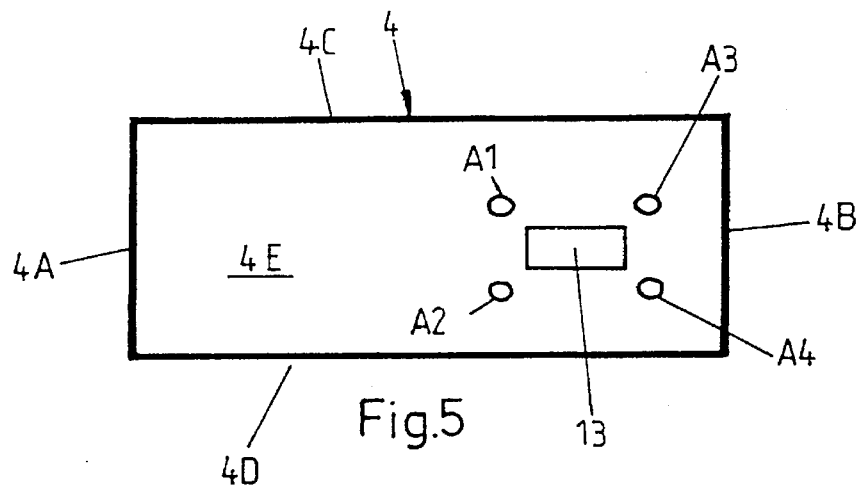
Figure 6:
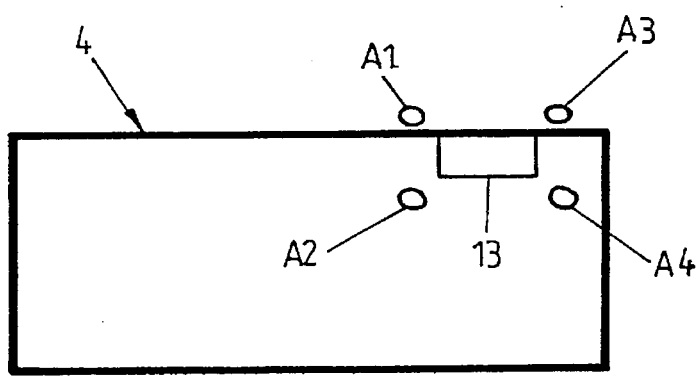
Figure 7:
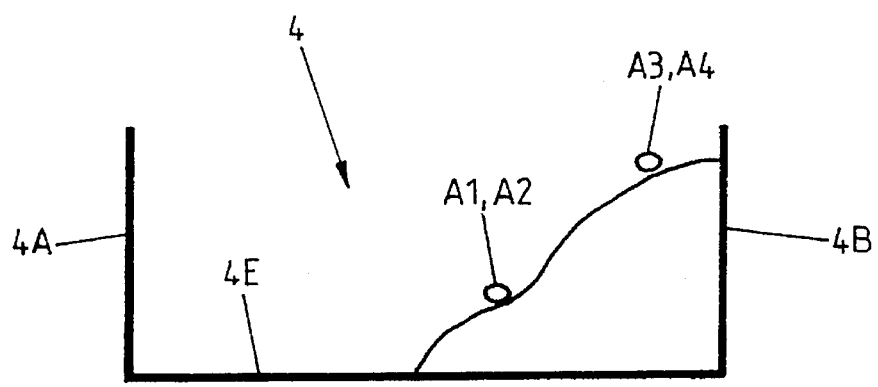
Figure 8:
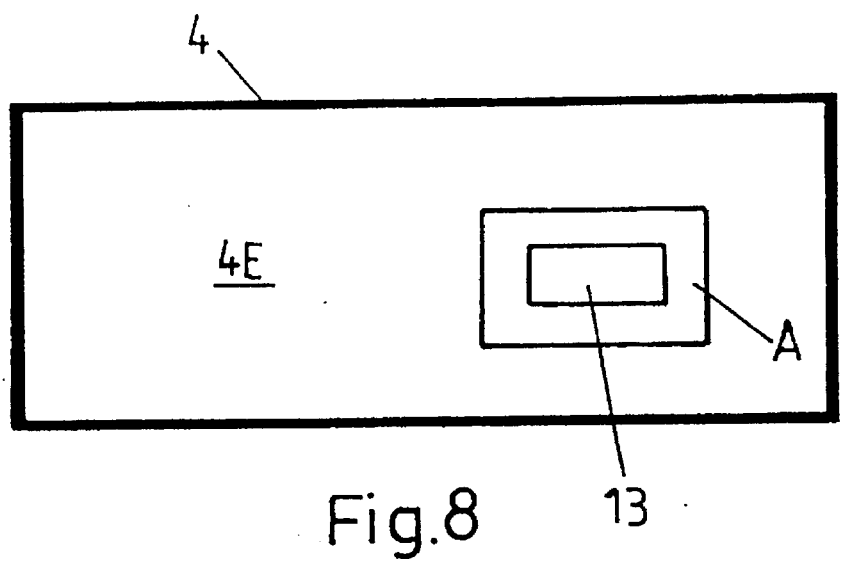
Figure 9:
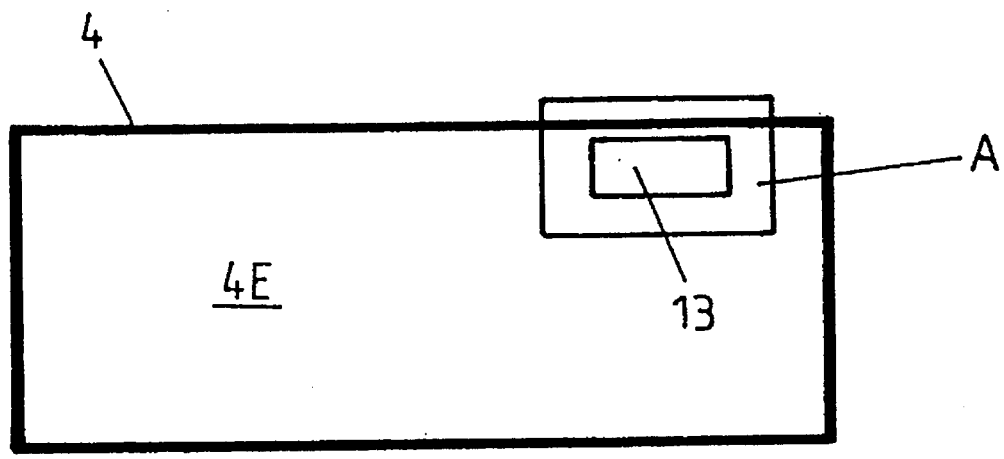

The transmitters and receivers of the range finder 6 are disposed on the front of the housing 6A facing the direction of discharge. The locating beams OS originating in the range finder 6 impact adjoiningly to the exiting material stream 13 on the container 4 (see FIGS. 5, 6 and 8, 9). In addition, the locating beams OS1, OS2 extend slightly divergingly away from the tangential discharge direction of the material stream 13 discharged from the discharge flap 5. The locating beams OS transmitted by the range finder 6 preferably impact a plurality of relatively small scanning surfaces disposed distributed around the impact surface of the material stream 13 striking the container 4. Four rectangularly disposed scanning surfaces A1, A2, A3, A4 are shown in FIGS. 5 and 6. However, it is also provided that the locating beams OS form a scanning surface A partially or completely enclosing the material stream 13 striking the container 4 (see FIGS. 8 and 9).

A motor 8, preferably a hydraulic motor, is disposed on the ring mount 7 for horizontal pivoting of the discharge knee 3, which is controllable via two control valves SV1, SV2, one for turning to the right and one for turning to the left. These control valves SV1, SV2 are electrically controlled by the evaluation and control installation 10 as a function of the distance signals ES and a control program (See FIG. 4).

The hydraulic cylinder 9 provided on the discharge flap 5 for the vertical pivoting thereof is controlled via two inclination control valves SV3, SV4, one for upward pivoting and one for downward pivoting. The inclination control valves SV3, SV4 themselves can be electrically controlled by the evaluation and control installation 10 in accordance with distance signals ES received from the range finder 6 (see FIG. 4). The valves SV1, SV2, SV3, SV4 are preferably constituted by magnetic valves. If required, two additional valves SV5, SV6 are provided for the control of a further additional hydraulic cylinder 9A which pivots the discharge knee 3 in relation to the ring mount 7. The associated knee pivot angle WAK is indicated to the control installation 10 by a potentiometer 11B.

A position indicator 11 is furthermore provided on the discharge knee 3 for reporting the respective horizontal pivot position DW to the evaluation and control installation 10. This position indicator 11 is preferably constituted by a potentiometer which is displaced together with the horizontal pivoting of the discharge knee 3. An end switch S2, S3 is provided on the harvester 1 in the two pivot angle end positions, whose respective switched states (open, closed) are supplied to the evaluation and control installation 10 (see FIG. 1 and FIG. 4). The standardization of the ring mount pivot position signal DW and a direct alignment into the preferred positions can be simply controlled by means of this. During the movement on the road to or from a harvesting operation, the discharge knee 3 is pivoted to the back into a parked position opposite the direction of travel. This position of the discharge knee 3 is also reported to the evaluation and control device 10 via a parking contact switch S1.

The device has a manually operated position selection switch S4 with three switch positions which is preferably disposed in the driver compartment of the harvester 1. For overriding the automatic settings, the switch positions are supplied to the evaluation and control installation 10 which, depending on the switch position, actuates the control valves SV1, SV2 for horizontal pivoting of the discharge knee 3. The discharge knee 3 is pivoted into the parked position in the center position m of the position selection switch S4, in the left position l of the switch S4 the discharge knee 3 is pivoted into the left position in relation to the direction of travel and in the right switch position r into a right position in relation to the direction of travel (see FIG. 4).

A second position indicator 11A for reporting the inclined position of the discharge flap 5 to the evaluation and control installation 10 is preferably provided on the discharge flap 5.

Figure 10:
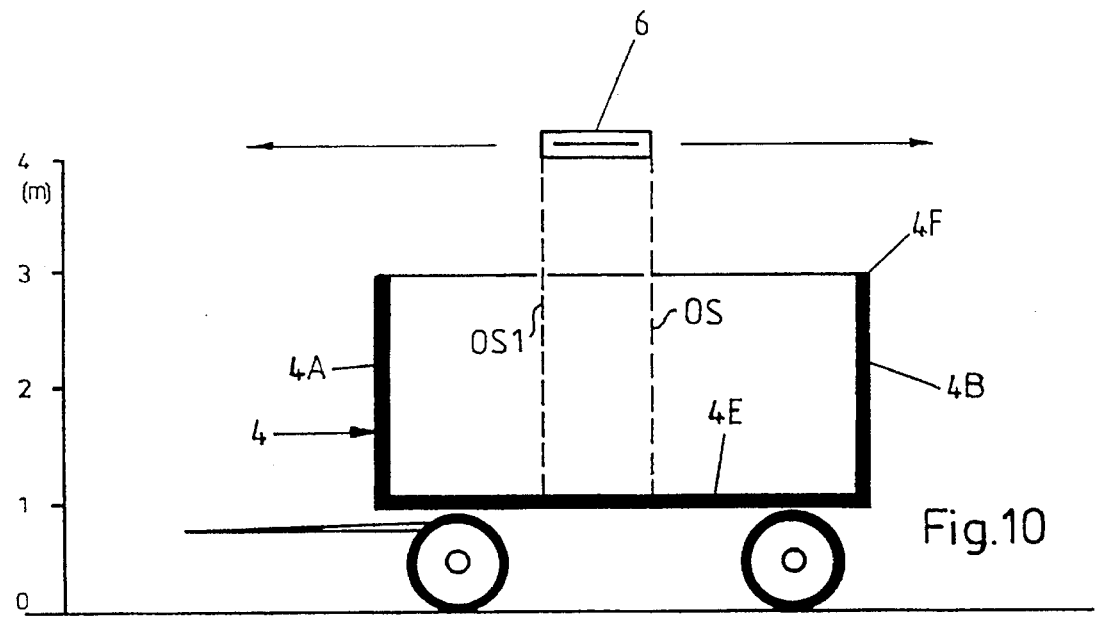

A height scale with a container wagon 4 empty is shown in cross section in FIG. 10. The downward inclined range finder 6 is disposed above the container wagon 4.

Figure 10A:
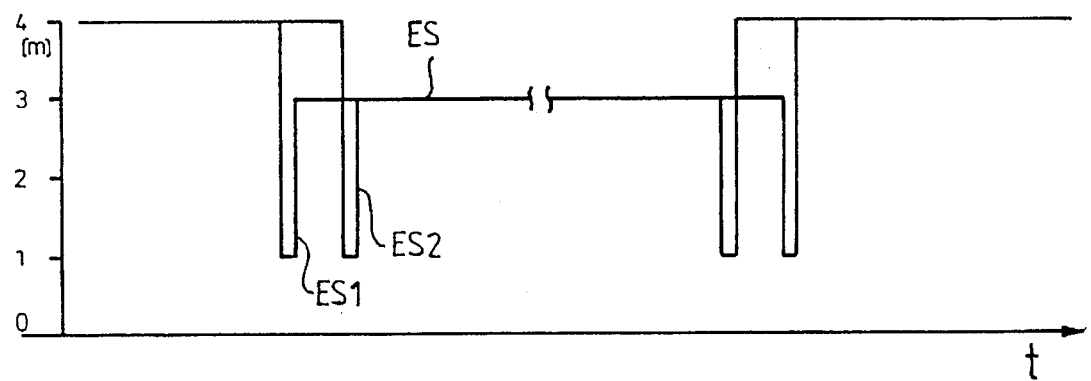

The signal path measured in the course of horizontal pivoting of the discharge knee 3 above the container wagon 4 or in the course of displacement of the container wagon 4 in respect to the discharge knee 3 with the range finder 6 is shown in FIG. 10A. The height differences as a function of the time t, for example the pivoting time, determined by means of the locating beams OS1, OS2 shown, are illustrated there. This signal path can be stored in the evaluation and control installation 10. The signal ES1 corresponds to the locating beam OS1, and the signals ES@ to the locating beam OS2. The height difference between the upper edges 4F of the container walls 4A, 4B, 4C, 4D and the container floor 4E can be determined in this way. Taking the respective pivot angle and the pivot time which elapses between the registration of the front and rear container walls 4A, 4B into account, the length of the container 4 can be determined by means of the evaluation and control installation 10.

Figure 11:
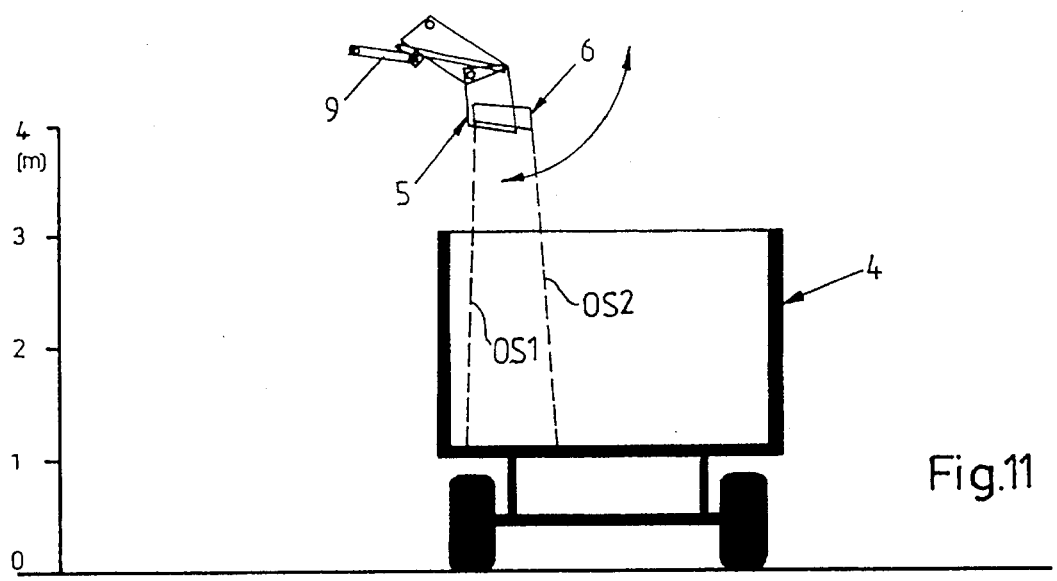
Figure 11A:
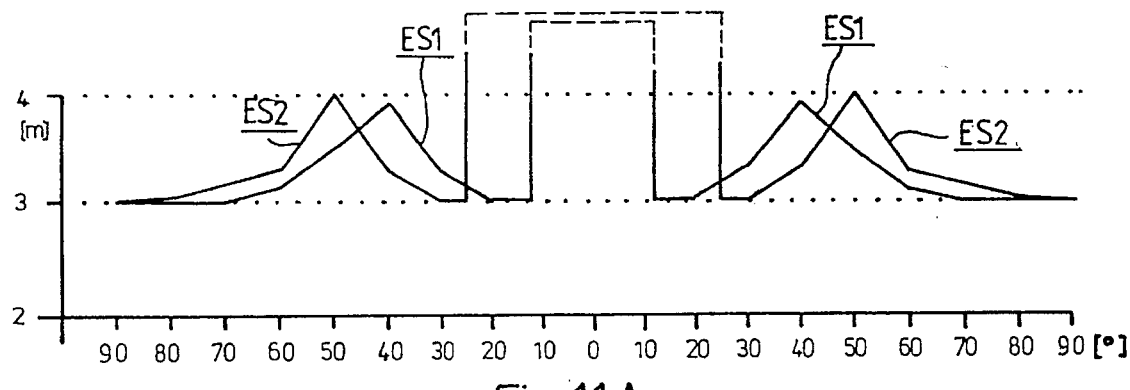
Figure 11B:
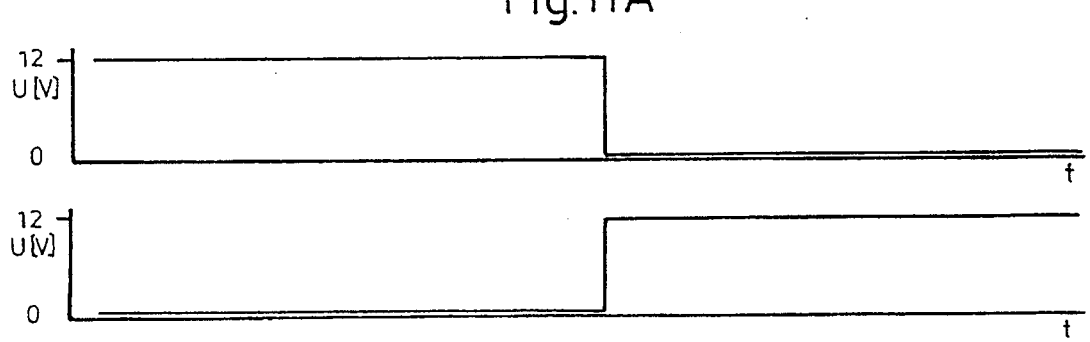

A height scale with a container wagon 4 empty is shown in cross section in FIG. 11. The discharge flap 5 with the range finder 6 is in the vertically downward inclined position above the container wagon 4. Starting from this position, the discharge flap 5 with the range finder 6 is vertically pivoted upward into the horizontal position and back into the illustrated initial position for transverse measuring of the container wagon 4. The distance signals ES1, ES2 determined by means of the illustrated locating beams OS1, OS2 are shown in relation to the inclination pivot angles in FIG. 11A. The width and height of the container 4 can be determined from these distance signals ES1, ES2, together with the respective inclination pivot angle (lower scale), by means of a coordinate transformation. The discharge knee is preferably transversely set for measuring the transverse profile, so that calculations can be made based on simple polar coordinates. The preset control voltages at the inclination control valves SV3, SV4 during pivoting are represented in FIG. 11B.

The load volume of the container 4 can be determined by the evaluation and control installation 10 from the length, width and height of the hold of the container 4 measured and calculated in this manner. Furthermore, with the pouring properties of the loaded material known, a maximum fill level which maintains a sufficient distance from the container edge can be determined by the evaluation and control installation 10 from the cross-sectional and height measurements.

Figure 12:
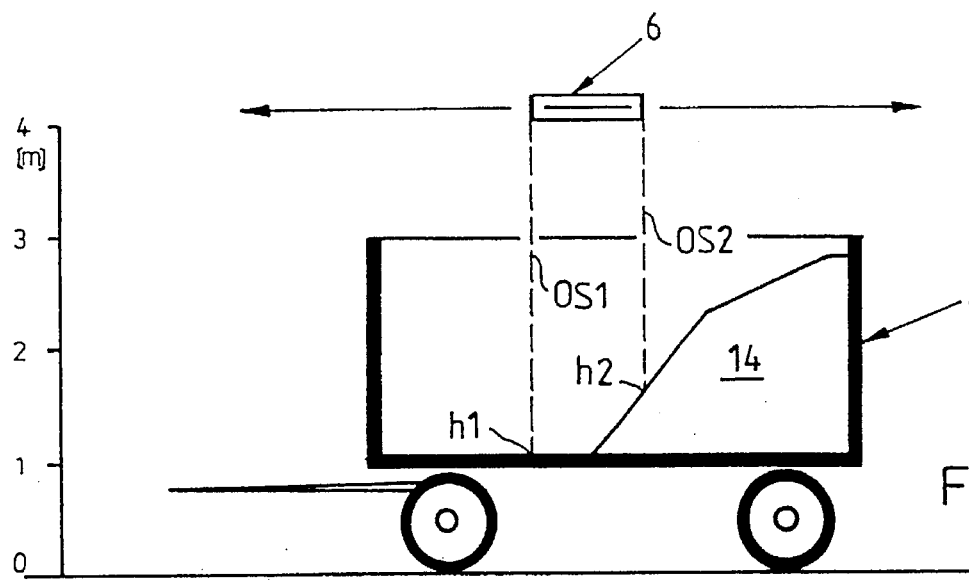
Figure 12A:
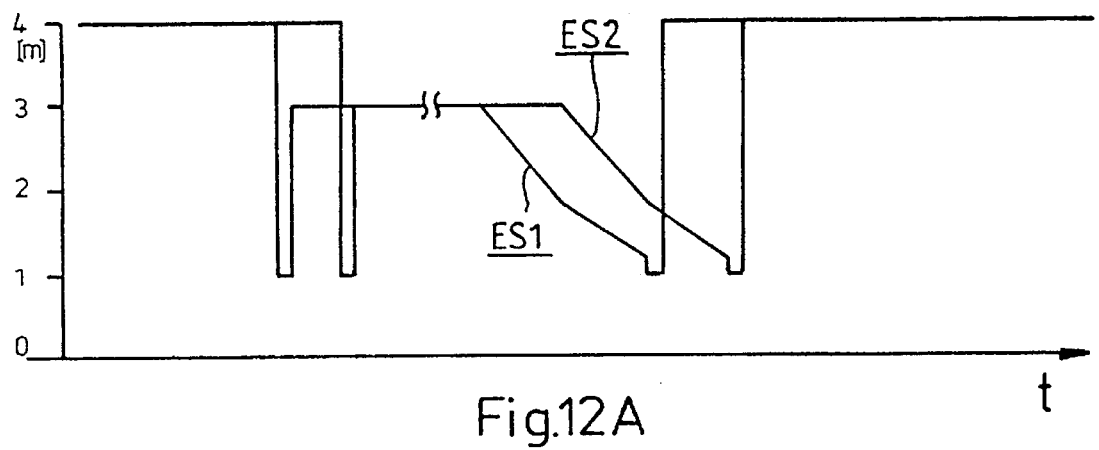

A height scale with the container wagon 4 partially filled is shown in longitudinal section in FIG. 12. The downward inclined range finder 6 is disposed above the container wagon 4. The distance signals ES1, ES2 determined by means of the locating beams OS1, OS2 are shown in relation to the pivot time t in FIG. 12A. The path of the distance signals ES1, ES2 is mirror-reversed in respect to the path of the locally measured fill heights h1, h2.

Figure 13:
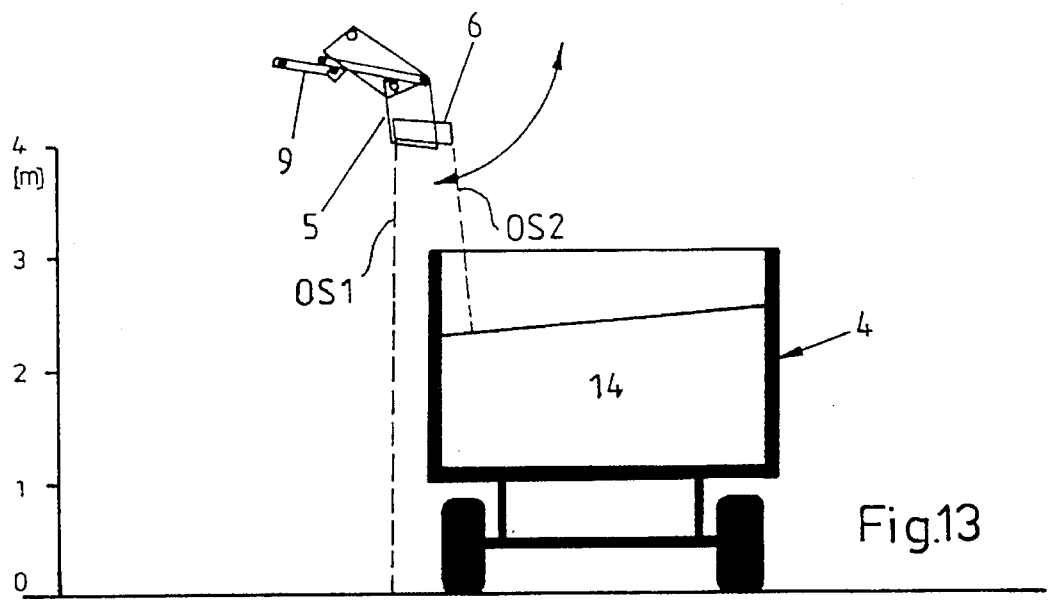
Figure 13A:
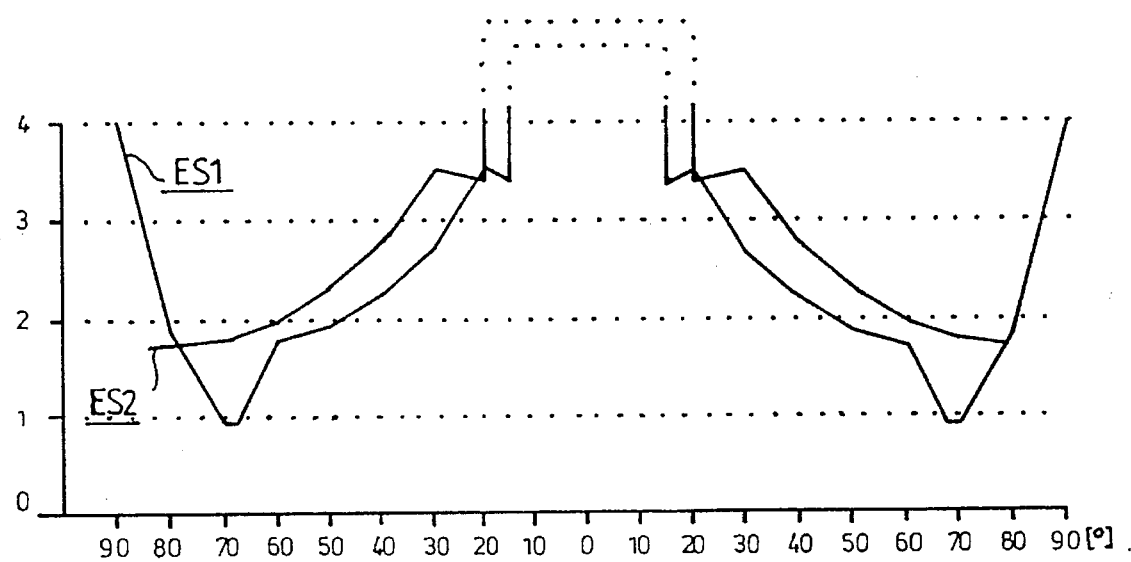
Figure 13B:
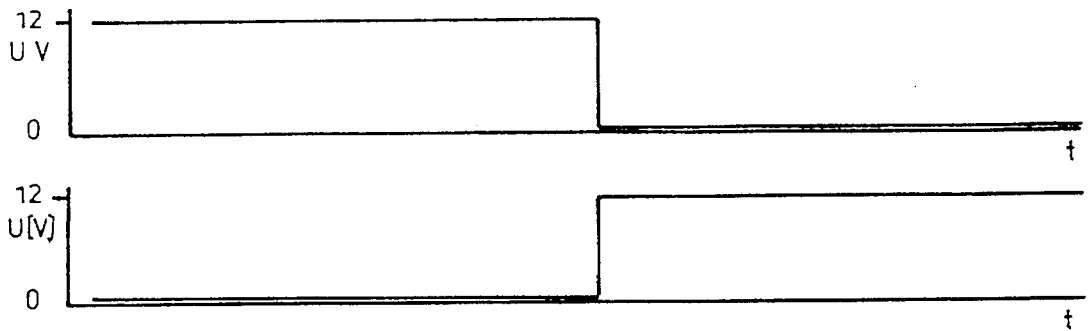

A height scale with the container 4 partially filled is shown in cross section in FIG. 13. The downward inclined discharge flap 5 with the range finder 6 is located above the lateral container wall. The distance signals ES1, ES2 determined by means of the locating beams OS1, OS2 are represented in relation to the inclination pivot angle in FIG. 13A. These distance and angle signals are also suitably transformed from the polar into the Cartesian form. The respectively predetermined control voltages at the inclination control valves SV3, SV4 during pivoting are represented in FIG. 13B. The movement of a locating beam above the container edge is respectively signaled by a sudden large distance measure.

The front view on the housing 6A of an embodiment of the range finder 6 is represented in FIG. 14. A plurality of inlet and outlet lenses 6E are disposed distributed along three sides of the material outlet on the front face, through which the locating beams OS exit and through which the beams RS reflected by the container 4, the loaded material 13 or the ground enter the receiver(s) in the range finder 6.

Four rectangularly disposed transmitting Lasers 6B, which are respectively surrounded by an array of individual photosensitive cells 6C, are located on the front face of the housing 6A of the embodiment of the range finder 6 illustrated in FIG. 15. By means of a suitable phase control of the individual photosensitive cells 6C it is possible to achieve an optimum setting of the receiving direction characteristics for receiving the reflected beams RS. The four locating beams surround the material outlet on all sides.

An embodiment of the range finder 6 with piezo elements 6D as ultrasound transmitters and receivers, disposed evenly distributed over the front face of the U-shaped housing 6A, is shown in FIG. 16.

The embodiment of the range finder 6 represented in FIG. 17 has arrays of individual piezo elements 6D, which act as ultrasound transmitters and receivers. The array is respectively distributed on all four sides of the material outlet.

Figure 18:
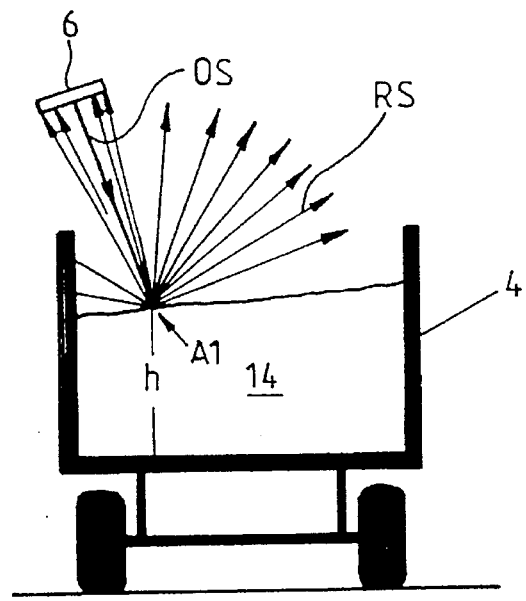

A container wagon 4, partially loaded with material 14, is represented in FIG. 18. A locating beam OS falls on the loaded material 14 and forms a small scanning surface A1 there. A bundle of reflected beams RS pointing in different directions issues from this scanning surface A1. A portion of the beams is also reflected into the range finder 6 and there reaches the receiver(s), where it is used for distance measurement by means of a measurement of their transit time.

Figure 19:
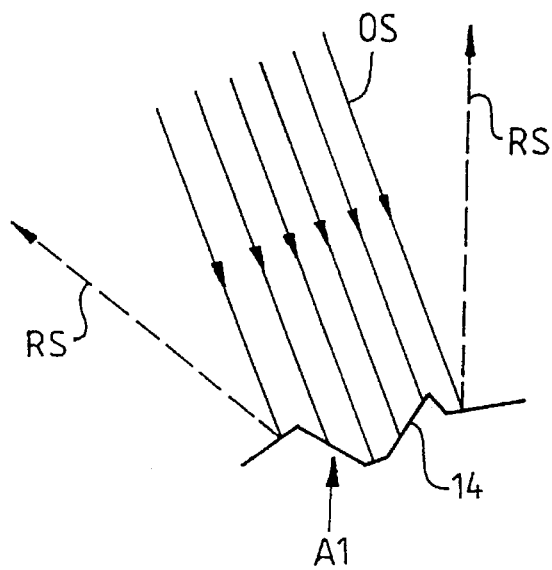

The surface of a loaded material 14, for example silage, is not ideally smooth but relatively uneven because of the different orientations of individual fibers or the like. This results in parallel incoming locating beams OS being diffusely scattered. This is represented in FIG. 19, in which the area of the scanning surface A1 is shown enlarged in contrast to FIG. 18. Even the slight surface roughness of the container walls and floor are sufficient to assure that a portion of the locating beams OS impinging on the container 4 at different angles is always reflected back to the receiver.

The range finder 6 and the automatic pivot control for changing the discharge direction are activated by the actuation of a main switch S5 (FIG. 4). The evaluation and control installation 10 operates an optical or acoustic display 15 when the container 4 has been filled to such an extent that the local fill level h lies below the predeterminable maximum fill level at any location. The driver is informed of the automatic pivot control being switched on by means of an indicator light 16. The driver is also informed by means of a further optical or acoustic display 17 whether the discharge knee 3 is in a pivot angle end position or in the parked position. The control installation 10 continuously checks whether the scanning surface A surrounding the material stream or at least one of the small scanning surfaces A1 to A4 is located outside of the container 4, which is indicated via an optical or acoustic warning device 20, when required.

Figure 20:
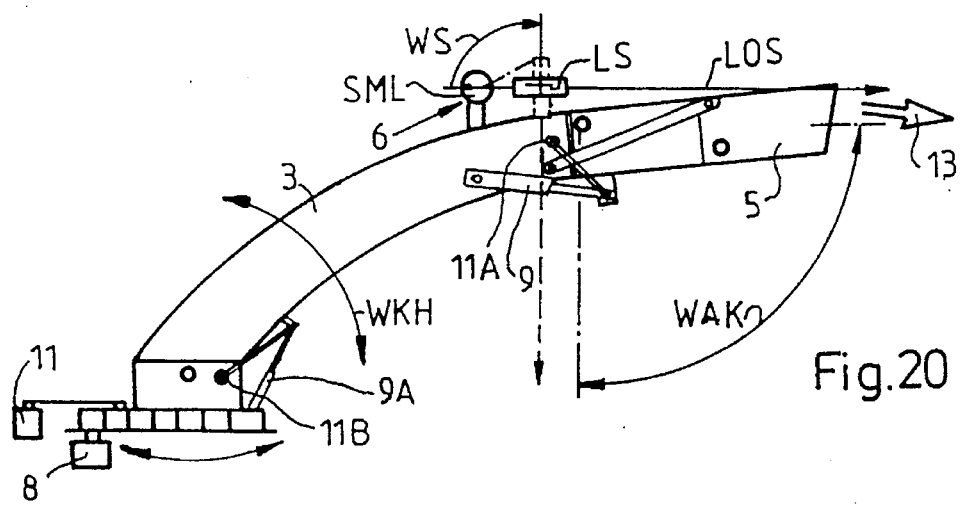

Because of the continuous relative movement between the discharge device and the container 4 it is advantageous to determine the impact area of the material stream 13 continuously. For this, continuous scanning of the container 4 by means of a movable range finder 6, a Laser scanner is provided. Based on the geometry of the knee 3, the impact area is dependent on the following factors:

the angle WAK of the discharge flap 5 (FIG. 20), the height of the knee determined by the knee height angle WKA, the direction of discharge, i.e. the discharge angle DW (FIG. 1).

Figure 21A:
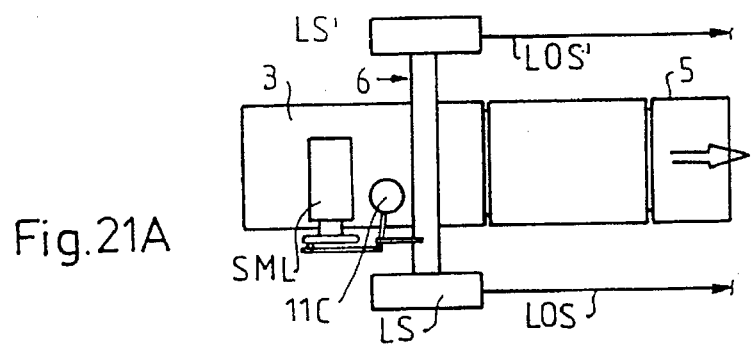
Figure 21B:
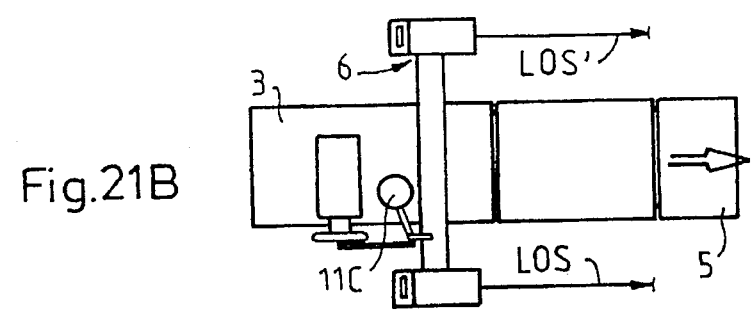
Figure 21C:
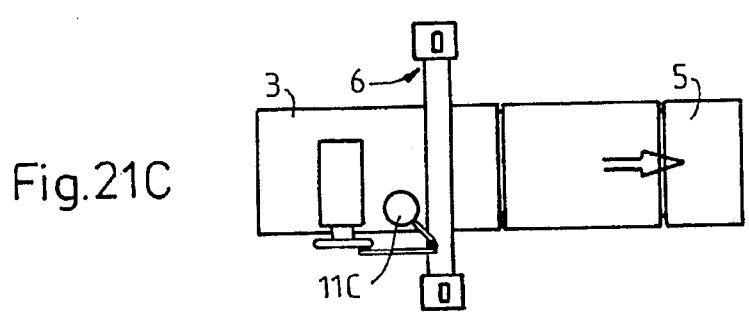

Top views of the knees 3 with the controllable flap 5 and the range finder 6 in scanner form are represented in FIGS. 21A to 21C. Two Laser range finders LS, LS' transmitting the Laser locating beams LOS, LOS' and receive the reflected light are mounted on both sides of the knee 3 on a horizontal pivot shaft, which is pivoted by means of the Laser pivot motor SML over a scanning angle WS between a horizontal and a vertical position, which is shown for the scanning angle zero in FIG. 21C, a small angle in FIG. 21B and a large angle in FIG. 21A. The respective scanning angle WS is signaled to the control installation 10 by the potentiometers 11C (FIG. 4).

The knee height, which generally is adapted once to the conditions, can be controlled by the hydraulic adjuster 9A (FIG. 20) by means of electromagnetic control valves VS5, VS6 (FIG. 4), wherein the knee height angle WKH is reported to the control installation 10 by the potentiometer 11A.

The Laser scanning device SML, LS is provided for the continuous scanning of the container 4, which makes it possible to move the Laser locators LS, LS' inside a set scanning angle WS. The location of the scanning device can principally be on the movable flap portion 5 of the knee 3 as well as on the knee 3 itself, as illustrated.

Figure 22:
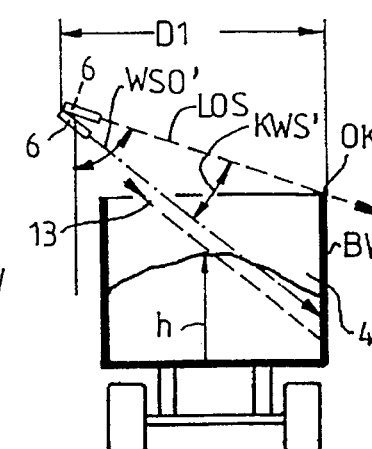

In accordance with a first method the device with the Laser scanner operates in such a way that the impact area of the material stream 13, 13' is always approximately located in the longitudinal axis in the center of the cross section of the container, as shown in FIG. 22. A standard width of 2.50 m can be assumed for the containers, or it is determined as previously described. When the sensor beam LOS locates the upper edge OK of the container edge BW facing away from the chopper 1, the distance D of the discharge flap 5 from the remote container edge BW is calculated from the three angles WS, DW, WKH existing at that time. Since as a rule the height WKH of the knee is not changed during loading and the fill level h after each scanner cycle is known, an angle WAK of the discharge flap 5 is calculated as a function of the respective fill level h and is set so that the impact area of the material stream 13 is located exactly in the center of the cross section of the container at the respective fill level h. The container 4 can be optimally filled in this manner, particularly when filled from above which, however, requires an as constant as possible movement of the container in relation to the chopper.

Figure 23:
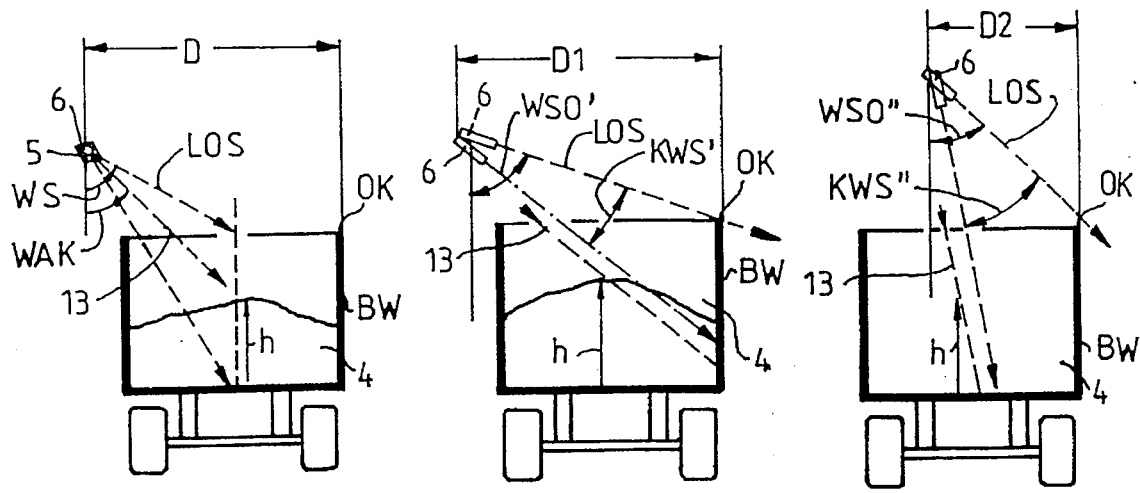
Figure 23A:
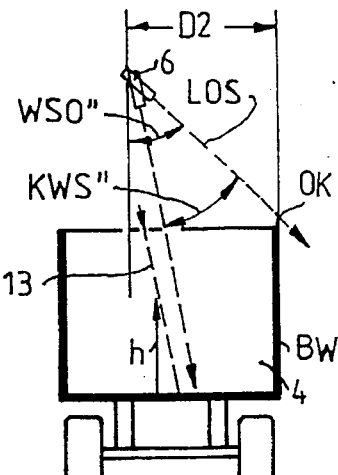

In accordance with a second method the device with the Laser scanner operates in such a way that a continuous setting of the discharge flap 5 as a function of the scanning angle WSO', WSO" during the determination of the upper edge OK of the remote container edge BW takes place. This method is explained in FIGS. 23 and 23A.

Based on the actual observation that the discharge flap 5 is the primary determinant for the impact area of the material stream 13 in the container 4, the scanning angle WSO', WSO" is determined during the detection of the upper edge OK of the remote container rim BW. Depending on the size of the respective scanning angle WSO', WSO", the discharge flap 5 is retracted to a greater or lesser extent. With a small scanning angle WSO", the flap 5 is retracted by a larger angle range KSW", with a large angle WSO', it is only slightly retracted, i.e. by a smaller angle range KSW', wherein the respective so-called retraction angle range KWS', KWS" is determined downward oriented, starting from the associated upper edge scanning angle WSO', WSO" together with an empirical function. This results in the effect that with an increasing fill level h the impact area is displaced away from the container edge BW. For oblique filling with an increased or changing lateral displacement D1, D2 of the container 4 from the discharge flap 5 this has the advantage that material losses are minimized.

Thus very simple control program and only small pivot movements of the discharge flap 5 are the result. In the first method the lateral container edge position D in respect to the discharge flap 5 and the fill level h are determined by means of the scanner 6. With the second method only the scanner pivot angle WSO', WSO" is continuously determined when scanning the container edge OK. For this purpose it is only necessary to preset marginal pivot angle changes in the Laser pivot motor LML, so that the Laser locating beam LOS oscillate around the upper edge OK and only pivot completely from time to time for measuring the fill level. The control of the associated flap retraction angle KWS', KWS" is directly determined from the scanning pivot angle WSO', WSO" measured at the upper edge OK. In the course of this determination it is possible to usefully include the initially measured container sizes, such as width, container wall height, if different container types are being employed.

Since the scanner locating beams LOS, LOS' scan the areas of the front and rear side of the discharge device, two Laser beams are sufficient here, while with a fixed disposition of the distance sensors on the discharge flap at least three are required to prevent the material flow from passing above the container edges BW; however, four distance sensors are suitably provided.

In principle, a fixed locating beam on one side of the material stream and a pivoting one on the other side is sufficient. The fixed locating beam is only needed to report the approach of the material stream to one of the front walls of the container.

It is furthermore also possible to deflect a single sensor beam in two directions, for example a small ellipse or a Lissajous curve, preferably approximately U-shaped, which passes through the area in front of and behind the material stream, viewed in the direction of travel, as well as the container wall edge laterally of the loading location. For this purpose the deflection amplitude in the direction of travel is suitably selected to be considerably less than the lateral amplitude, and the frequency of the linear deflection is selected to be half of that of the transverse deflection frequency.

By fixing the phase relationship, respectively one of the reversing points is located slightly ahead of or behind the material stream and the other reversing points back of the remote container wall.

What is claimed is:

1. A device for automatic filling of a mobile container (4) with a material stream (13) from a harvester (1) moving alongside the container, the device comprising:

means for transporting the material stream from the harvester (1) to the container (4), the means for transporting being controllably pivotable around a vertical and a horizontal axis;

a pivotable discharge flap at an end of the means for transporting;

a range finder (6), consisting of one of an optical or an acoustic range detector, for measurement of the container (4) and for measuring fill levels (h) of the loaded material (14), the range finder being disposed on the discharge knee pipe (3), such that the range finder (6) can be pivoted horizontally and vertically selectively together with the means for transporting and independently thereof;

means for generating distance signals (ES) generated by the range finder (6) and supplying the distance signals to an electronic evaluation and control installation (10), which continuously regulates a horizontal pivot position, a vertical pivot position of the means for transporting, and a flap pivot position of the discharge flap (5); whereby loading of the container (4) is achieved with as few losses as possible by means of the fed-back distance signals (ES).

2. The device in accordance with claim 1, wherein the range finder (6) consists of a laser-interferometer measuring device with at least one transmitting laser (6B) and photosensitive cells (6C), wherein the locating beams (OS, LOS, LOS') emitted by the transmitting laser (6B) are at least partially reflected by one of the container (4), the loaded material (14) and the ground into the photosensitive cells (6C), or an ultrasound measuring device with one of a plurality of ultrasound transmitters and receivers (6D), such a piezo elements, wherein the locating beams (OS) emitted by the ultrasound transmitters (6B) are at least partially reflected by the container (4), the loaded material (14) and the ground into the receivers.

3. The device in accordance with claim 2, wherein action of the locating beams (OS) emitted by the range finder (6) consists of first action upon a scanning surface (A) at least partially enclosing the material stream (13) impacting on the container (4), or second action wherein the locating beams (OS) emitted by the range finder (6) act upon a plurality of narrowly defined scanning surfaces (A1, A2, A3, A4) disposed around the surface of the material stream (13) impacting on the container (4), and the range finder (6) emits and receives in a controlled pivotable manner, one locating beam (LOS, LOS') on each side respectively parallel to the material stream (13).

4. The device in accordance with claim 2, characterized in that the range finder (6) is disposed on the end area on the discharge side of the means for transporting (3), so that locating beams (OS) emitted by the range finder (6) impact the container (4) in the vicinity of the material stream (13) or extend slightly diverging from the material stream (13) is respect to the tangential discharge direction of the material stream (13) discharge from the means for transporting (3).

5. The device in accordance with claim 4, wherein action of the locating beams (OS) emitted by the range finder (6) consists of first action upon a scanning surface (A) at least partially enclosing the material stream (13) impacting on the container (4), or second action wherein the locating beams (OS) emitted by the range finder (6) act upon a plurality of narrowly defined scanning surfaces (A1, A2, A3, A4) disposed around the surface of the material stream (13) impacting on the container (4), and the range finder (6) emits and receives in a controlled pivotable manner, one locating beam (LOS, LOS') on each side respectively parallel to the material stream (13).

6. The device in accordance with claim 5, characterized in that the means for transporting (3) disposed on the harvester (1) is seated on a ring mount (7) horizontally pivotable over a pivot angle range of approximately 240° between two pivot angle end positions respectively disposed transversely to the longitudinal direction of the harvester, and that for horizontal pivoting of the means for transporting (3), the ring mount (7) is driven by a motor (8) which can be controlled via the evaluation and control installation (10).

7. The device in accordance with claim 1, wherein the range finder (6) is disposed on the end area on the discharge side of the means for transporting (3), so that locating beams (OS) emitted by the range finder (6) impact the container (4) adjacent the material stream (13) and extend slightly diverging from the material stream (13) in respect to the tangential discharge direction of the material stream (13) discharged from the means for transporting (3).

8. The device in accordance with claim 1, wherein the means for transporting (3) disposed on the harvester (1) is seated on a ring mount (7) horizontally pivotable over a pivot angle range of approximately 240° between two pivot angle end positions respectively disposed transversely to a longitudinal direction of the means for transporting (3), the ring mount (7) is driven by a motor (8) which can be controlled via the evaluation and control installation (10).

9. The device in accordance with claim 8, wherein a first position indicator (11) disposed on the means for transporting (3) reports a respective horizontal pivot position to the evaluation and control installation (10), and including one end switch (S2, S3) disposed on the harvester (1) in each respective pivot angle and position of the means for transporting (3), and means for supplying a respective switched state of open or closed to the evaluation and control installation (10).

10. The device in accordance with claim 8, wherein the motor (8) for pivoting the discharge means for transporting (3) comprises a hydraulic motor which can be controlled via two control valves (SV1, SV2), one for a turn to the right and one for a turn to the left, wherein the control valves (SV1, SV2) are respectively electrically triggered by the evaluation and control installation (10).

11. The device in accordance with claim 1, wherein the range finder (6) is disposed on the discharge flap (5), which is seated vertically pivotable on the end of the means for transporting (3), and wherein the discharge flap (5) is pivotable within a pivot range of approximately 90° by means of a hydraulic cylinder (9) hinged on the means for transporting (3), wherein the hydraulic cylinder (9) is controlled by two inclination control valves (SV3, SV4), one for upward pivoting and one for downward pivoting, which in turn are electrically triggered by the evaluation and control installation (10).

12. The device in accordance with claim 11, wherein a second position indicator is disposed on the vertically pivotable discharge flap (5), which signals an inclined position of the latter to the evaluation and control installation (10).

13. The device in accordance with claim 11, wherein the discharge flap (5) is pivotable between an approximately horizontal position and an approximately vertically downward oriented position.

14. The device in accordance with claim 1, wherein the range finder (6) is disposed in a U-shaped housing (6A) in the discharge flap (5) open at the bottom and overlaps it from above, wherein the transmitters (6B) and the receivers (6C) are disposed on the front of the housing (6A) facing the discharge direction.

15. The device in accordance with claim 1, wherein the evaluation and control installation (10) includes means for measuring an empty container (4) front-rear distance between a front and a rear container wall (4A, 4B), a lateral distance between the lateral container walls (4C, 4D) and a top-bottom distance from the top edges (4F) of the container walls (4A, 4B, 4C, 4D) to the bottom (4E) of the container (4), said means for measuring including means for horizontal and vertical pivoting of the range finder (6) and coordinate transformation, and means for determining and storing a load volume and a maximum fill height.

16. The device in accordance with claim 1, wherein during a loading operation the evaluation and control installation (10) continuously monitors the distance signals (ES) in respect to reaching a predetermined maximum fill level in a respective scanning area and, when this has been reached, systematically controls such continuing pivoting of the discharge means for transporting knee (3) and the discharge flap (5), until the distance signals (ES) indicate that the material stream (13) impacts at a location of the container (4) having a lesser fill level (h).

17. The device in accordance with claim 16, wherein the evaluation and control installation (10) actuates a warning device when evaluation of the distance signals (ES) indicates that one of the scanning surface (A) and at least one of the scanning surfaces (A1, A2, A3, A4) of the range finder (6) lies outside the container (4).

18. The device in accordance with claim 1, wherein the control installation (10) pivots the locating beam(s) (LOS, LOS') in a continous scanning manner through areas located ahead of and behind the material stream (13) in a direction of travel by means of a pivot device (SML) of the range finder (6) independently of the pivot position of the discharge flap (5), and calculates and controls by output thereof a discharge flap pivot angle (WAK) from a lateral distance (D) of an upper edge (OK) of a remote lateral container wall (BW) and a fill level (h) from the distance signals (ES) and a scanning pivot angle (WS) and the ring mount pivot angle signal (DW) and a range finder position of the range finder (6) on the harvester (1) by means of a coordinate transformation such that a central impact point of the material stream (13) lies in a cross-sectional center of the container (4) at the respective fill level (h), and the control installation (10) respectively checks when a maximum fill level has been reached and triggers a continuing pivot movement of the ring mount (7).

19. The device in accordance with claim 1, wherein the control installation (10) pivots the locating beam(s) (LOS, LOS') in a scanning manner through areas located ahead of or behind the material stream (13) a direction of travel by means of a pivot device (SML) of the range finder (6) independently of the pivot position of the discharge flap (5), and continuously detects an upper edge (OK) of a remote lateral container wall (BW) by means of the distance signals (ES) and determines the associated scanning pivot angle (WSO', WSO") in respect to the vertical and determines therefrom a retraction angle range (KWS', KWS") of an opposite value, by which it controllingly sets the discharge flap (5) directed downward in respect to the locating beam (LOS, LOS'), so that at a relatively large measured scanning pivot angle (WSO') the material stream (13') is directed approximately on the lower area of the remote lateral container wall (BW), and at a relative small measured scanning pivot angle (WSO") the material stream (13') is directed approximately on the cross-sectional center of the container bottom, and by means of the periodically pivoted locating beam (LOS, LOS') respectively checks the fill level (h) for having reached a maximal fill level and triggers a continuing pivoting movement of the ring mount (7) if required.

20. The device in accordance with claim 1, wherein the evaluation and control installation (10) actuates an acoustic and optical display (15) when the container (4) is filled with loaded material (14) so such an extent that the local fill level (h) is not below the maximum fill level at any place in the container (4).

21. The device according to claim 1, wherein the range finder includes only optical detection.

22. The device according to claim 1, wherein the range finder includes only acoustic detection.

23. The device according to claim 1, wherein the means for transporting includes a transfer belt conveyor.

24. The device according to claim 1, wherein the means for transporting includes a discharge knee pipe.

* * * * *